United States Patent
Tzeng et al.

(10) Patent No.: US 11,416,044 B2
(45) Date of Patent: Aug. 16, 2022

(54) BRACKET SUPPORTING EXPANSION CARD INSTALLATION USING A RISER CARD

(71) Applicant: Dell Products, L.P., Round Rock, TX (US)

(72) Inventors: Jing-Chi Tzeng, Taoyuan (TW); Mu-Ting Fang, Tainan (TW)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/015,657

(22) Filed: Sep. 9, 2020

(65) Prior Publication Data

US 2022/0075431 A1 Mar. 10, 2022

(51) Int. Cl.
*G06F 1/18* (2006.01)

(52) U.S. Cl.
CPC .............. *G06F 1/185* (2013.01); *G06F 1/186* (2013.01)

(58) Field of Classification Search
CPC ........ G06F 1/185; G06F 1/186; H05K 7/1418
See application file for complete search history.

(56) References Cited

U.S. PATENT DOCUMENTS 8,295,060 B2 * 10/2012 Liu .................... G06F 1/185
  361/800
8,451,623 B2 * 5/2013 Chiu .................. G06F 1/186
  361/801

* cited by examiner

*Primary Examiner* — James Wu
(74) *Attorney, Agent, or Firm* — Fogarty LLP

(57) ABSTRACT

Brackets are provided for coupling a replaceable expansion card to an Information Handling System (IHS). The brackets include a riser card portion that receives a riser card that couples the expansion card to a motherboard connector of the IHS. The riser card includes pins that couple to the motherboard connector and a connector that receives the expansion card. The riser card portion of the bracket includes a first channel that receives the riser card orthogonal to the expansion card. A card-receiving portion of the bracket receives the expansion card that includes pins that couple to the riser card connector when the expansion card is inserted in the card-receiving portion. The card-receiving portion of the bracket also includes a second channel that receives the expansion card and restricts vertical movement of the installed expansion card and also restricts vertical movement of the riser card when coupled to the expansion card.

20 Claims, 7 Drawing Sheets

BRACKET SUPPORTING EXPANSION CARD INSTALLATION USING A RISER CARD

FIELD

This disclosure relates generally to Information Handling Systems (IHSs), and more specifically, to the installation of IHS expansion cards.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs typically include a printed circuit board (PCB), commonly known as a motherboard, that provides electrical connections that support communications between components of the IHS that are mounted or otherwise coupled to the motherboard. Some IHS components are attached directly to the motherboard, such as a microcontroller that is soldered to pads or vias provided by the motherboard. Other IHS components may be attached indirectly to the motherboard via a connector provided by the motherboard, such as a memory module that is inserted within a memory slot connector provided by the motherboard, or such as a processor that is attached to a socket provided by the motherboard. In some cases, removeable hardware components may be coupled to such motherboard connectors in order to improve or otherwise alter the performance capabilities of the IHS. In such instances, removeable components that may be coupled to a motherboard connector may be expansion cards, where the expansion card also includes a PCB to which various components may be mounted. In some IHSs, physical constraints within an IHS may require a riser card or other interposer to be used in connecting an expansion card to a motherboard connector. In such instances, a riser card serves as an adapter that supports installation of expansion cards along an axis that is parallel to the motherboard.

SUMMARY

In various embodiments, brackets are provided for coupling a replaceable expansion card to an Information Handling System (IHS). The bracket may include: a riser card portion that receives a riser card that couples the expansion card to a motherboard connector of the IHS, wherein the riser card comprises a plurality of pins and a connector that receives the expansion card, and wherein the riser card portion comprises a first channel that receives the riser card orthogonal to the expansion card; and a card-receiving portion that receives the expansion card, wherein the expansion card comprises a plurality of pins that couple to the connector of the riser card when the expansion card is inserted in the card-receiving portion, and wherein the card-receiving portion comprises a second channel that receives the expansion card and restricts vertical movement of the installed expansion card and also restricts vertical movement of the riser card when the expansion card is coupled to the riser card.

In additional bracket embodiments, the expansion card comprises a graphics card. In additional bracket embodiments, the riser card portion of the bracket comprises a first plurality of protrusions for aligning the bracket with a first plurality of fastening elements by which a first hardware component has been installed to the IHS. In additional bracket embodiments, the alignment using the plurality of protrusions aligns the pins of the riser card with the motherboard connector. In additional bracket embodiments, the fastening elements comprise screws that fasten the installed first hardware component to the IHS. In additional bracket embodiments, the first hardware component comprises a fan system of the IHS. In additional bracket embodiments, the riser card portion is removable from the card-receiving portion of the bracket and wherein a replacement riser card portion comprises a second plurality of protrusions for aligning the bracket with a second plurality of fastening elements by which a second hardware component has been installed to the IHS. In additional bracket embodiments, the riser card is coupled to the motherboard and to the expansion card without use of any tools and without any fasteners. In additional bracket embodiments, the riser card portion comprises a handle for pulling the bracket from the IHS by pulling the pins of the riser card from the motherboard connector.

In various additional embodiments, Information Handling Systems (IHSs) may include: one or more processors coupled to a motherboard; the motherboard comprising a first expansion card connector; and a bracket for coupling a replaceable expansion card to the first expansion card connector of the motherboard, wherein the bracket comprises: a riser card portion that receives a riser card that couples the expansion card to the first expansion card connector of the motherboard, wherein the riser card comprises a plurality of pins and a connector that receives the expansion card, and wherein the riser card portion comprises a first channel that receives the riser card orthogonal to the expansion card; and a card-receiving portion that receives the expansion card, wherein the expansion card comprises a plurality of pins that couple to the connector of the riser card when the expansion card is inserted in the card-receiving portion, and wherein the card-receiving portion comprises a second channel that receives a retainer of the expansion card and restricts vertical movement of the installed expansion card and also restricts vertical movement of the riser card when the expansion card is coupled to the riser card.

In additional IHS embodiments, the riser card portion of the bracket comprises a first plurality of protrusions for aligning the bracket with a first plurality of fastening elements by which a first hardware component has been installed to the IHS. In additional IHS embodiments, the alignment using the plurality of protrusions aligns the pins of the riser card with the first expansion card connector of the motherboard. In additional IHS embodiments, the fastening elements comprise screws that fasten the installed first hardware component to the IHS. In additional IHS embodiments, the first hardware component comprises a fan system of the IHS.

In various additional embodiments, methods are provided for coupling a replaceable expansion card to an Information Handling System (IHS). The methods may include: seating a riser card in a riser card portion of a bracket, wherein the riser card comprises a plurality of pins and a connector that receives the expansion card, and wherein the riser card is seated within a first channel of the riser card portion that receives the riser card orthogonal to the expansion card; seating an expansion card in a card-receiving portion of the bracket, wherein the expansion card comprises a plurality of pins that couple to the connector of the riser card when the expansion card is seated in the card-receiving portion, and wherein the card-receiving portion comprises a second channel that receives the seated expansion card, wherein the second channel restricts vertical movement of the seated expansion card and also restricts vertical movement of the seated riser card; aligning one or more protrusions of the riser card portion of the bracket with respective reference structures of the IHS; and while the protrusions of the riser card portion are aligned with the reference structures, coupling the pins of the riser card to a motherboard connector of the IHS.

In additional method embodiments, the alignment using the one or more protrusions of the riser card portion of the bracket aligns the pins of the riser card with the motherboard connector. In additional method embodiments, the reference structures comprise screws that fasten a first hardware component to the IHS. In additional method embodiments, the first hardware component comprises a fan system of the IHS. In additional method embodiments, the riser card is seated in the bracket, the expansion card in seated in the bracket, and the riser card is coupled to the motherboard connector without use of any tools. In additional method embodiments, methods may further include pulling the bracket comprising the seated riser card and the seated expansion card from the IHS by pulling the pins of the riser card from the motherboard connector using a handle of the riser card portion of the bracket.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
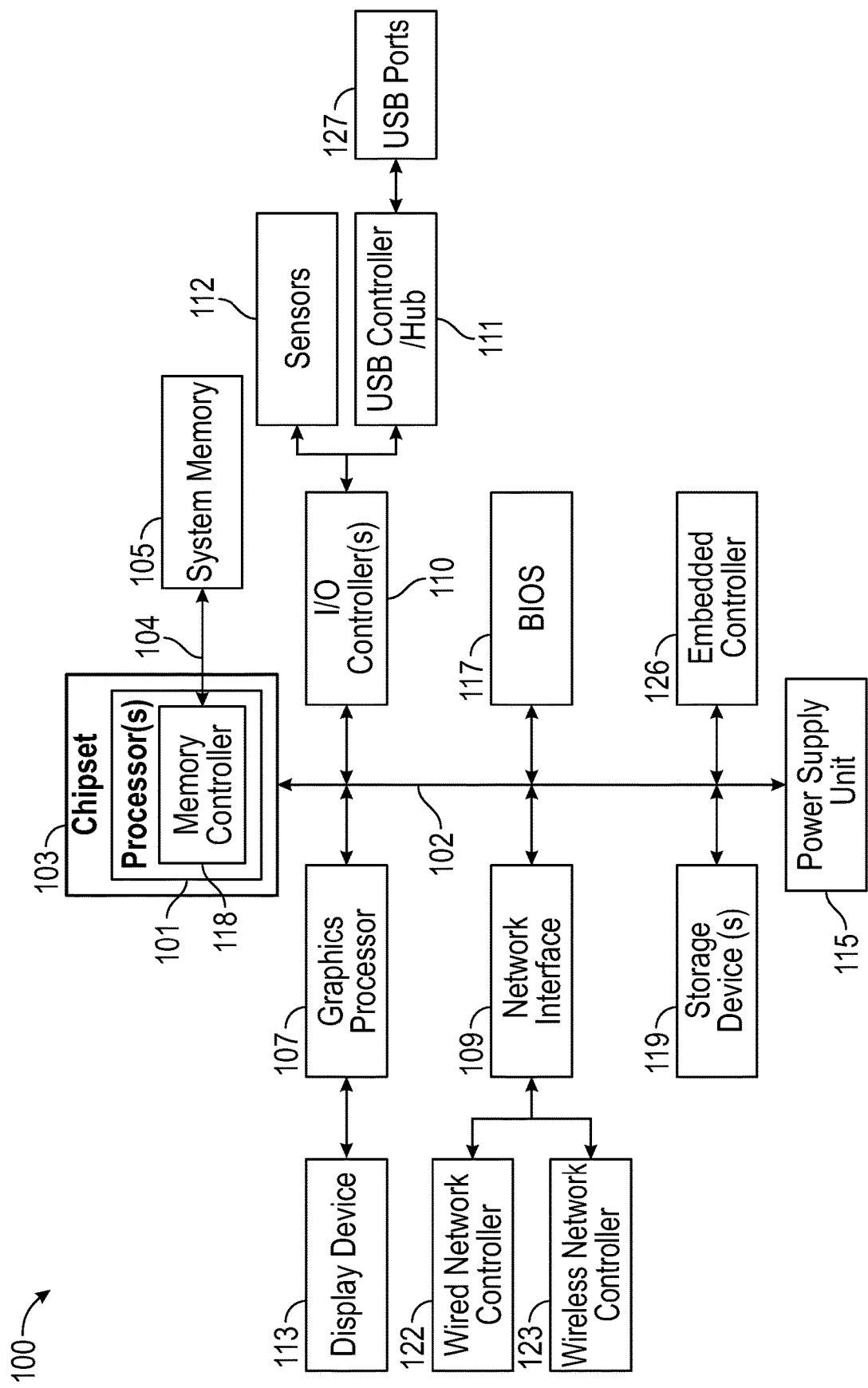
FIG. 1 is a block diagram depicting certain components of an IHS according to various embodiments that may support use of a bracket supporting installation of an expansion card using a riser card.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, such as a desktop computer, other embodiments may be utilized.

FIG. 1 is a block diagram depicting certain components of an IHS 100 according to various embodiments that may support use of a bracket supporting installation of an expansion card to the IHS 100 using a riser card. IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs). In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104.

The system memory 105 that is coupled to processor 101 provides the processor with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NICs), each of which may implement the hardware required for communicating via a specific networking technology, such as Wi-Fi, BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized by applications of the operating system of IHS 100. In some embodiments, one or both of network controllers 122, 123 may be implemented on a removeable expansion card that is coupled to a connector on the motherboard of IHS 100. As described in additional detail below, embodiments support the installation of such network controller 122, 123 expansion cards to the motherboard of IHS 100 using a bracket that receives the network controller expansion card and that also receives a riser card that couples the expansion card to a motherboard connector of IHS 100.

Chipset 103 may also provide access to one or more display device(s) 113 via graphics processor 107. In certain embodiments, graphics processor 107 may be comprised within a video or graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 113 coupled to the IHS 100. In some embodiments, graphics processer 107 may be implemented on an expansion card that is coupled to a motherboard connector of IHS 100. As described in additional detail below, embodiments support the installation of such graphics controller 107 expansion cards to the motherboard of IHS 100 using a bracket that receives the expansion card and that also receives a riser card that couples the expansion card to the motherboard of IHS 100. In some instances, graphics processor 107 may be mounted to a PCB of the expansion card and may be enclosed within a shroud that is fastened to the expansion card PCB. In some instances, this shroud may include airflow cooling elements such as a cooling fan and/or heatsinks. In some embodiments, the dimensions of this shroud may be selected in order to maintain alignment of the expansion card with the bracket such that the expansion card is properly aligned with a connector of a riser card that has been installed in the bracket.

The one or more display devices 113 coupled to IHS 100 may utilize LCD, LED, OLED, or other display technologies. Each display device 113 may be capable of receiving touch inputs such as via a touch controller that may be an embedded component of the display device 113 or graphics processor 107, or may be a separate component of IHS 100 accessed via bus 102. In embodiments where IHS 100 is a laptop, tablet, 2-in-1 convertible device, or mobile device, display device 113 may be an integrated display device. In some embodiments, IHS 100 may be a hybrid laptop computer that includes dual integrated displays incorporated in both of the laptop panels.

In certain embodiments, chipset 103 may utilize one or more I/O controllers 110 that may each support hardware components such as user I/O devices 111 and sensors 112. For instance, I/O controller 110 may provide access to one or more user I/O devices 110 such as a keyboard, mouse, touchpad, touchscreen, microphone, speakers, camera and other input and output devices that may be coupled to IHS 100. Each of the supported user I/O devices 111 may interface with the I/O controller 110 through wired or wireless connections. In certain embodiments, sensors 112 accessed via I/O controllers 110 may provide access to data describing environmental and operating conditions of IHS 100. In some embodiments, sensors 112 may include geo-location sensors capable for providing a geographic location for IHS 100, such as a GPS sensor or other location sensors configured to determine the location of IHS 100 based on triangulation and network information. Various additional sensors, such as optical, infrared and sonar sensors, that may provide support for xR (virtual, augmented, mixed reality) sessions hosted by the IHS 100.

As illustrated, I/O controllers 110 may include a USB controller 111 that, in some embodiments, may also implement functions of a USB hub. In some embodiments, USB controller 111 may be a dedicated microcontroller that is coupled to the motherboard of IHS 100. In other embodiments, USB controller 111 may be implemented as a function of another component, such as a component of a SoC of processor 101. USB controller 111 supports communications between IHS 100 and one or more USB devices coupled to IHS 100. In some embodiments, a USB controller 111 may operate one or more USB drivers that detect the coupling of USB devices and/or power inputs to USB ports 127. USB controller 111 may include drivers that implement functions for supporting communications between IHS 100 and coupled USB devices, where the USB drivers may support communications according to various USB protocols (e.g., USB 2.0, USB 3.0, USB 3.1, USB 3.2). In providing functions of a hub, USB controller 111 may support concurrent couplings by multiple USB devices via the USB ports 127 supported by IHS 100.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. In some embodiments, BIOS 117 may be implemented using a dedicated microcontroller coupled to the motherboard of IHS 100. In some embodiments, BIOS 117 may be implemented as operations of embedded controller 126. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Some IHS 100 embodiments may utilize an embedded controller 126 that may be a motherboard component of IHS 100 and may include one or more logic units. In certain embodiments, embedded controller 126 may operate from a separate power plane from the main processors 101, and thus from the operating system functions of IHS 100. In some embodiments, firmware instructions utilized by embedded controller 126 may be used to operate a secure execution environment that may include operations for providing various core functions of IHS 100, such as power management and management of certain operating modes of IHS 100. Embedded controller 126 may also implement operations for interfacing with a power supply unit 115 in managing power for IHS 100.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2:
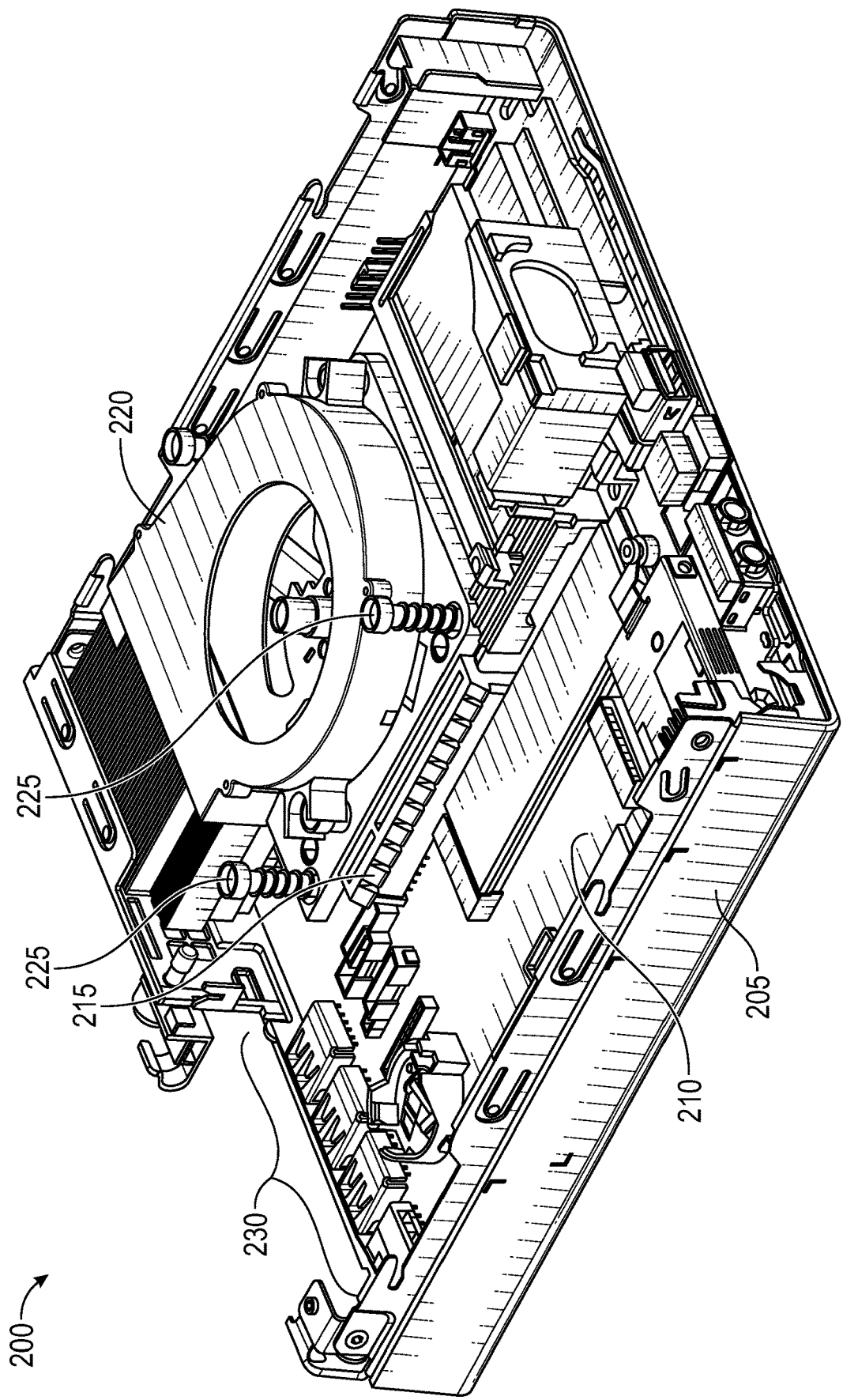
FIG. 2 is an illustration of certain internal components of an IHS configured according to various embodiments to support use of a bracket supporting installation of an expansion card using a riser card.

FIG. 2 is an illustration of certain internal components of an IHS 200 configured according to various embodiments for use of a bracket supporting installation of an expansion card using a riser card. In various embodiments, IHS 200 may include a chassis 205 in which various internal components may be installed. For instance, a motherboard 210 may be fastened to the base of chassis 205. Motherboard 210 may include a variety of electronic components that are permanently fixed to its surface, where these components may range from individual capacitors and transistors to microcontrollers, such as the controllers described with regard to FIG. 1. Motherboard 210 may also include various connectors by which removable components may be coupled to IHS 200 in order to improve or otherwise alter the performance capabilities of IHS 200.

One such connector of motherboard 210 may be an expansion card connector 215 by which a removable expansion card may be coupled to IHS 100. For instance, as described with regard to FIG. 1, a user may install a graphics card that includes a graphics processor in order to improve the graphics processing capabilities of an IHS, such as for use of the IHS in gaming, virtual reality and/or 3-D modeling applications. As described in additional detail below, a removable expansion card may be coupled to motherboard 210 via expansion card connector 215 using a bracket that receives the expansion card and that also receives a riser card that is connected to motherboard connector 215 such that the expansion card may be installed parallel to motherboard 210. Once installed in IHS 200, the expansion card may include various connectors, ports and status indicators that are externally accessible via opening 230 of chassis 205.

In some instances, a user's ability to install a removable expansion card within IHS 200 is complicated by the relative inaccessibility of expansion card connector 215. In many IHSs, motherboards are densely packed with a variety of delicate components that may be permanently damaged by user struggling with poor visibility while attempting to couple an expansion card to a motherboard connector. The task of installing an expansion card to motherboard connector 215 may be further complicated due to the internal volume of an IHS also being densely packed with components, with this problem increasing in magnitude as IHSs become increasingly smaller in size. For instance, in IHS 200, a user's view of expansion card connector 215 is partially obscured by fan system 220 that is fastened to chassis 205 via stand-off screws 225. A user attempting to use a riser card to couple an expansion card to motherboard connector 215 is unable to easily view the mating of the riser card to connector 215 due to the user's view of the connector 215 being blocked by fan system 220.

Figure 3A:
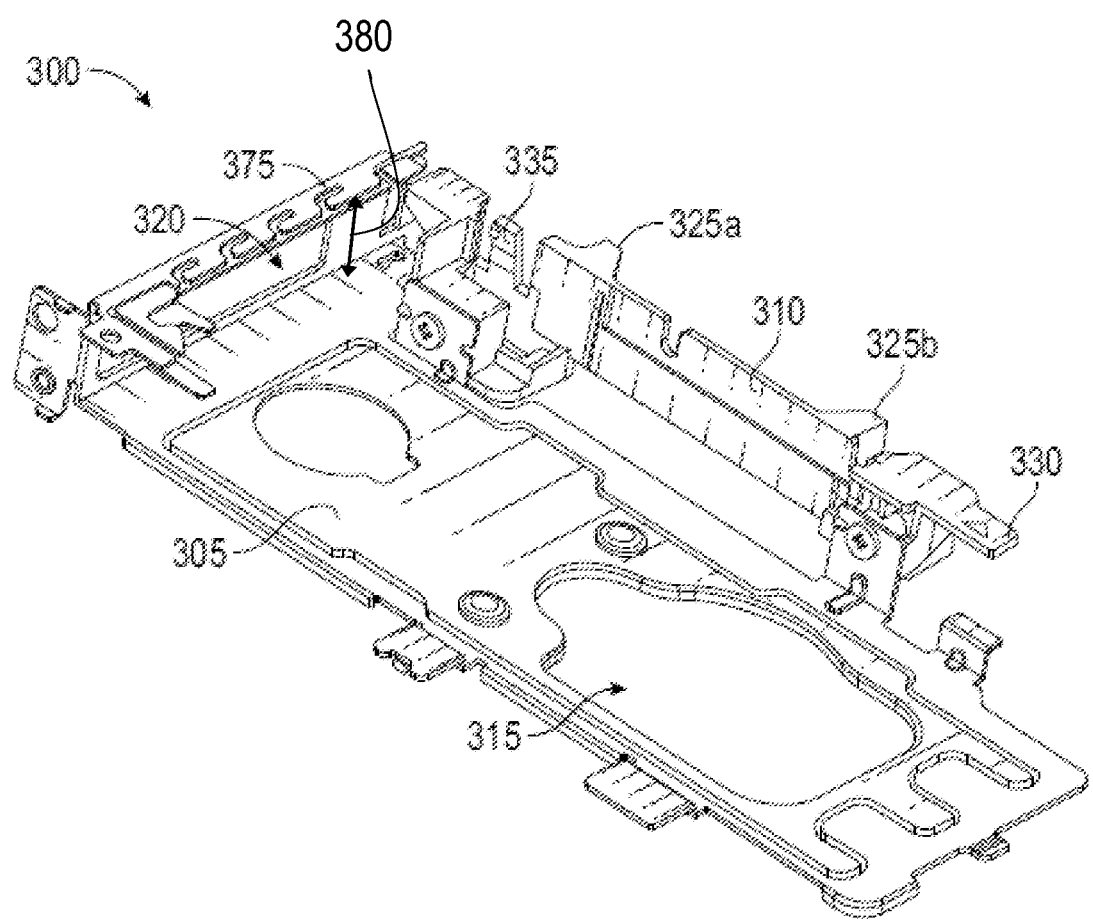
FIG. 3A is an illustration of a bracket according to various embodiments that supports installation of an expansion card to an IHS using a riser card.

FIG. 3A is an illustration of a bracket 300 according to various embodiments that supports installation of an expansion card to an IHS using a riser card. In some embodiments, bracket 300 may be formed from stamped sheet metal. In other embodiments, bracket 300 may be formed from plastic materials, such as via injection molding or 3-D printing. In various embodiments, bracket 300 may be formed from at least two separate portions. A card-receiving portion 305 receives an expansion card that a user slides into the bracket 300 until it is seated within the bracket. A riser card portion 310 of the bracket 300 receives a riser card that couples the expansion card to a motherboard connector. In the illustrated embodiment, the riser card portion 310 may be a removeable component that is fastened to the card-receiving portion 305 using two screws. As described in additional detail below, in such embodiments, different riser card portions with different physical characteristics may be attached to the card-receiving portion 305 in order to adapt the bracket 300 for different expansion card applications. In some embodiments, riser card portion 310 may be an integral portion of the bracket 300 and may not be removable from the card-receiving portion 305 of the bracket. In some embodiments, the bottom surface of the card-receiving portion 305 may include openings, such as opening 315, that may accommodate airflow cooling of an expansion card installed within the bracket 300. In particular, the size and shape of opening 315 may be selected to correspond to airflow cooling capabilities of a shrouded processor that is attached to an expansion card that is coupled to bracket 300.

As described in additional detail below, an expansion card is inserted and seated in bracket 300 by the force applied by a user in sliding the expansion card into the bracket in a direction that is parallel to the bottom surface of the card receiving portion 305. The expansion card may include a retainer that is received by a rear channel 380 of the bracket that is defined by the bottom surface of the card receiving portion 305 and by a flange 375 that extends from the rear face of the bracket 300. As illustrated, the rear face of bracket 300 includes an opening 320. When an expansion card is installed within bracket 300 by sliding the retainer of the expansion card within the rear channel 380 of the bracket, various ports, connectors and status indicators of the expansion card are exposed via opening 320. When bracket 300 is installed in an IHS, these ports, connectors and status indicators of the expansion card may be externally accessible, such as via opening 230 of the IHS of FIG. 2.

The riser card portion 310 of bracket 300 receives a riser card that a user slides into a channel 335 of the riser card portion. The width of this channel 335 may correspond to the thickness of the printed circuit board from which a particular type of riser card is constructed, such that the riser card is held firmly in place when inserted within this channel 335. In some embodiments, the inside of channel 335 may include deformable protrusions or clips that allow the riser card to be pushed into the channel 335 and hold the riser card firmly in place once it has been seated within the channel. As described in additional detail below, the riser card portion 310 may also include protrusions 325a-b that extend outward from the bracket 300 and allow a user to align the bracket during installation such that a riser card that has been inserted in the riser card portion 310 is aligned with an expansion card connector of the motherboard. In some embodiments, riser card portion 310 may also include a handle 330 that may be used to pull the riser card, and hence the bracket 300, from this motherboard connection in order to uninstall and extract an expansion card from an IHS.

Figure 3B:
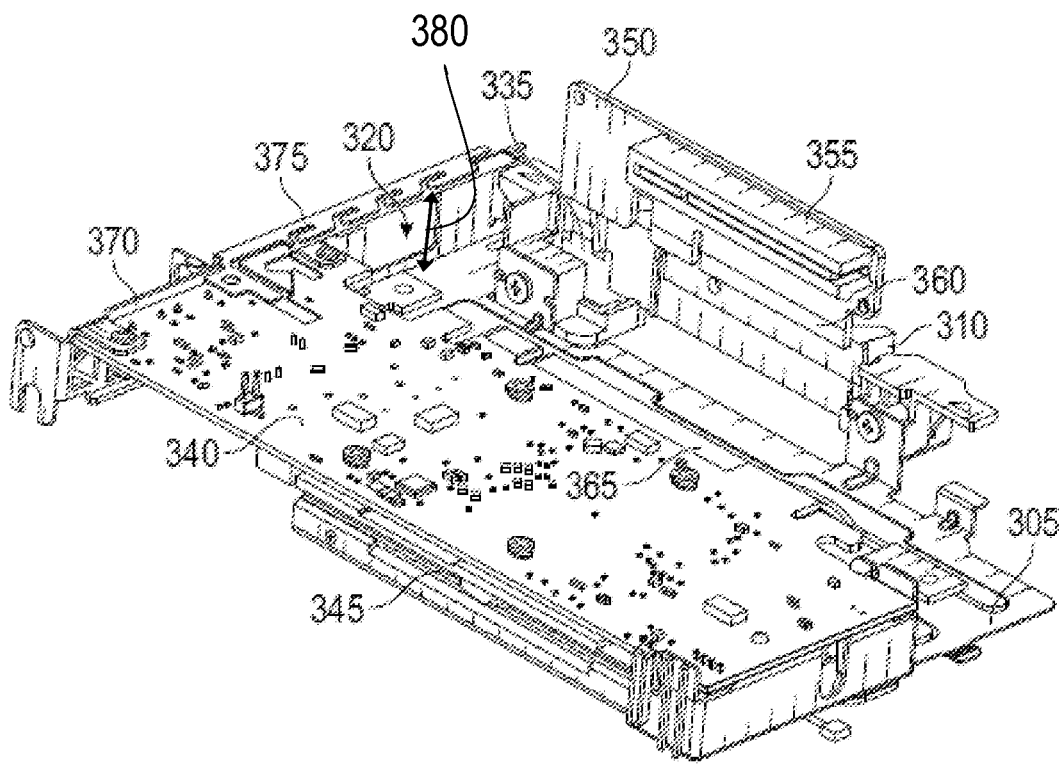
FIG. 3B is an illustration of a bracket according to various embodiments that depicts the coupling of an expansion card and a riser card to the bracket.

FIG. 3B is an illustration of a bracket according to various embodiments that supports the coupling of an expansion card 340 and a riser card 350 to the bracket. In FIG. 3B, the expansion card 340 and riser card 350 are both partially installed within their respective positions in the bracket. In order to complete the installation of these components in the bracket, riser card 350 is first inserted in the riser card portion 310 of the bracket. A user completes installation of the riser card 350 by sliding a circuit board portion of the riser card into the channel 335 of the riser card portion 310 of the bracket. Once riser card 350 has been firmly seated within the riser card portion 310 of the bracket, a set of pins 360 (that may also be referred to as an edge connector or pin header) of the riser card 350 extend below the bracket. With the riser card 350 seated in the riser card portion 310, the connector 355 of the riser card is positioned to receive expansion card 340.

With the riser card 350 seated in the channel 335 of the riser card portion 310 of the bracket, the user slides the expansion card 340 into the card-receiving portion 305 of the bracket. As described, an expansion card 340 may include a retainer 370 on one end, where this retainer may include various ports, connectors and/or status indicators of the expansion card. The retainer 370 may be formed from metal or plastic in various embodiments. In some embodiments, retainer 370 may be of a height that corresponds to the height of a rear channel 380 of the bracket. This rear channel 380 for receiving the retainer 370 of the expansion card 340 may be defined by the bottom surface of the card-receiving portion 305 and by a flange 375 of the rear face of the bracket. The expansion card 340 is inserted in the bracket by a user sliding the retainer 370 within this rear channel until a set of pins 365 of the expansion card are coupled to the connector 355 of the riser card 350.

Once expansion card 340 has been fully installed to the bracket and has been coupled to riser card 350, the connectors, ports and/or status indicators of the retainer 370 may be externally accessible via opening 320 in the rear face of the bracket. As illustrated, expansion card 340 may include a shroud 345 or other structure that may house processing components, such as a graphics processor, and may also house cooling components, such as a slim form factor fan system and/or heat sinks. When expansion card 340 has been installed in the bracket, an opening 315 in the card-receiving portion 305 of the bracket may support airflow to such airflow cooling components installed within shroud 345. In some embodiments, the height of shroud 345 and/or the dimensions of the bracket may be selected such that the shroud 345 may rest on the bottom surface of the card-receiving portion 305 of the bracket while maintaining the circuit board portion of the expansion card 340 parallel to the card-receiving portion 305 of the bracket and also maintaining the circuit board portion of the expansion card 340 at a height at which the pins 365 of the expansion card are aligned vertically with the connector 355 of the seated riser card 350.

Figure 3C:
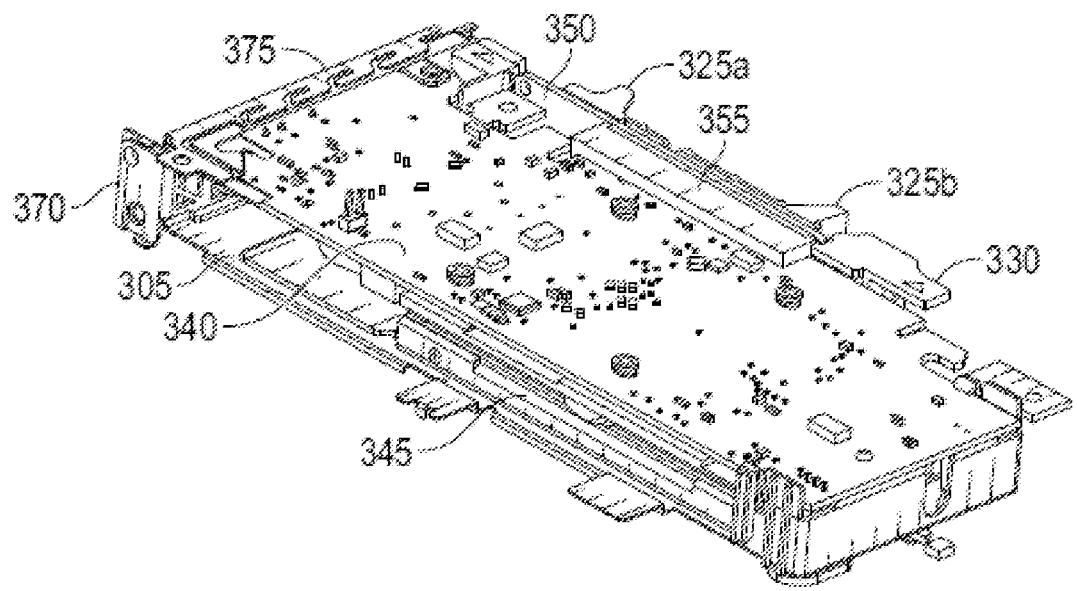
FIG. 3C is an illustration of a bracket according to various embodiments that depicts an expansion card and a riser card coupled to the bracket.

FIG. 3C is an illustration of a bracket according to various embodiments where an expansion card 340 and a riser card 350 have been coupled to the bracket. In FIG. 3C, both the riser card 350 and the expansion card 340 have been fully seated within their respective positions in the bracket. As illustrated, the pins of the expansion card have been mated with the connector 355 of the riser card 350. The retainer 370 of the expansion card is positioned within the rear channel 380 of the bracket that is defined by the bottom surface of the card-receiving portion 305 and by the flange 375 of the rear face of the bracket. Also as illustrated, shroud 345 may rest on the bottom surface of the card-receiving portion 305 of the bracket such that the circuit board of the expansion card 340 is parallel to the bottom surface of the card-receiving portion 305.

Installed in this manner, the vertical movement of expansion card 340 is limited by the restriction of retainer 370 within the rear channel 380 of the bracket. Since the retainer 370 of the expansion card cannot move vertically within this rear channel 380 of the bracket, the expansion card 340 is likewise limited in its vertical movement. Accordingly, this limit on the vertical travel of the installed expansion card 340 serves to lock riser card 350 in its seated position in the riser card portion of the bracket and keeps the expansion card firmly coupled to the connector 355 of the riser card without use of any fasteners, and thus without use of any tools. A user may thus install both the riser card 350 and the expansion card 340 within the bracket and couple these components firmly together without requiring use of any tools and without use of any fasteners to fix these components together.

Figure 4A:
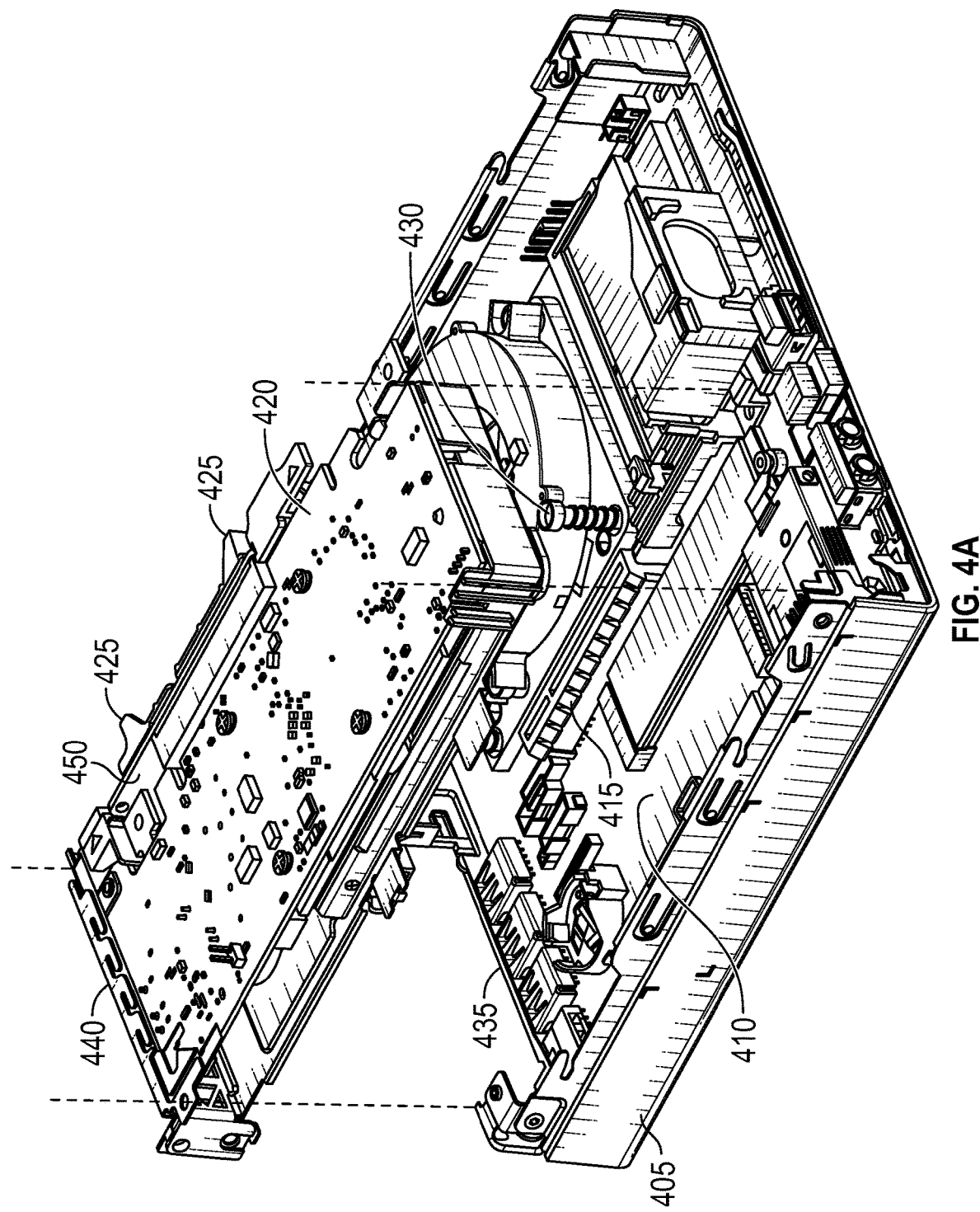
FIG. 4A is an illustration of the installation of an expansion card to an IHS utilizing a bracket according to various embodiments that supports installation of an expansion card using a riser card.

FIG. 4A is an illustration of the installation of an expansion card 420 to an IHS utilizing a bracket 440 according to various embodiments that supports installation of an expansion card using a riser card. In FIG. 4A, the bracket 440 which includes the seated riser card 450 and the seated expansion card 420, is being installed in an internal expansion bay within the chassis 405 of an IHS. As described above, the motherboard 410 of an IHS may include an expansion card connector 415. As illustrated, the bracket 440 is installed by a user lowering the bracket in the indicated direction into the expansion bay of the IHS. The bracket 440 is lowered in the indicated direction until the pins of the riser card 450 are received by the expansion card connector 415 of motherboard 410. The rear face of bracket 440 may be designed to correspond to the dimensions of an expansion bay opening 435 of the chassis 405 such that rear facing bracket 440 occupies the entire expansion bay opening 435 once the bracket has been installed.

As described, the coupling of an expansion card to motherboard connector 415 may be complicated by the motherboard connector 415 being partially obscured by the expansion card itself and by adjacent components, such as by the fan system of the IHS. Accordingly, the protrusions 425 of the riser card portion of bracket 440 provide a user with the ability to align the bracket with the motherboard connector 415, even if the user is unable to see the motherboard connector 415 as it receives the pins of the riser card. As described in additional detail below, a user may align these protrusions 425 with reference structures within the IHS, such as the screws 430 used to fasten the fan system to the chassis 405 of the IHS, in order to align the pins of the riser card 450 with the motherboard connector 415.

Figure 4B:
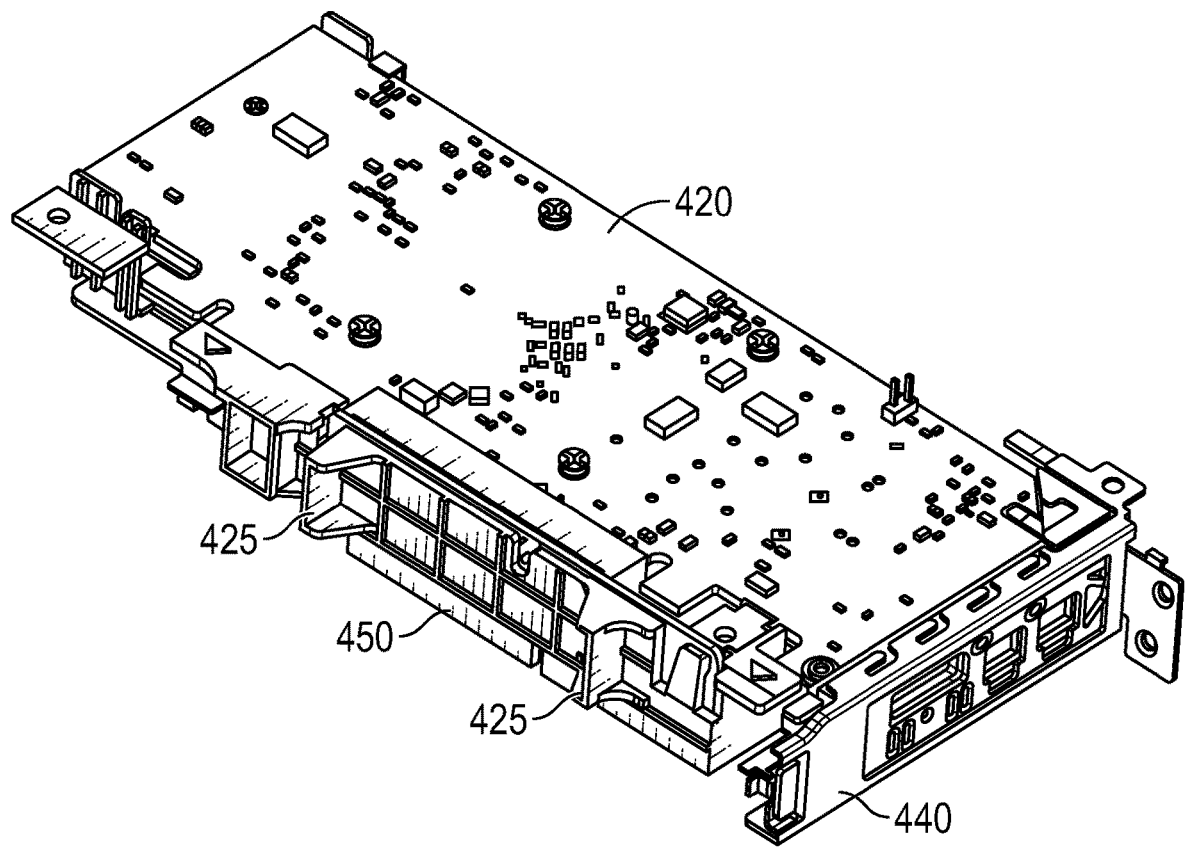
FIG. 4B is another illustration of a bracket according to various embodiments that depicts an expansion card and a riser card coupled to the bracket.

FIG. 4B is another illustration of a bracket according to various embodiments that supports an expansion card and a riser card coupled to the bracket. The illustration of FIG. 4B provides an opposite perspective of the bracket of FIG. 3C such that the riser card portion of the bracket and the rear face 440 of the bracket are more readily visible. In FIG. 4B, expansion card 420 has been installed in the bracket and has been mated with the connector of riser card 450 that is seated within the riser card portion of the bracket. Installed in this manner, the ports, connectors and/or status indicators of the expansion card are externally accessible via the opening in the rear face 440 of the bracket.

As illustrated, the riser card portion of the bracket includes two protrusions 425. These protrusions may be spaced from each other at a distance that corresponds to the distance between internal reference structures of the IHS, such as the distance between the protruding portions of stand-off screws that are used to install the fan system of the IHS. The locations of protrusions 425 on the riser card may be selected such that, when the protrusions are aligned with the internal reference structures, the pins of the riser card 450 are aligned with the expansion card connector of the motherboard. In various additional embodiments, different geometries of protrusions may be utilized by different riser card portions in order to align a riser card with a motherboard connector, where the different geometries of protrusions may correspond to different reference structures within the IHS.

Figure 4C:
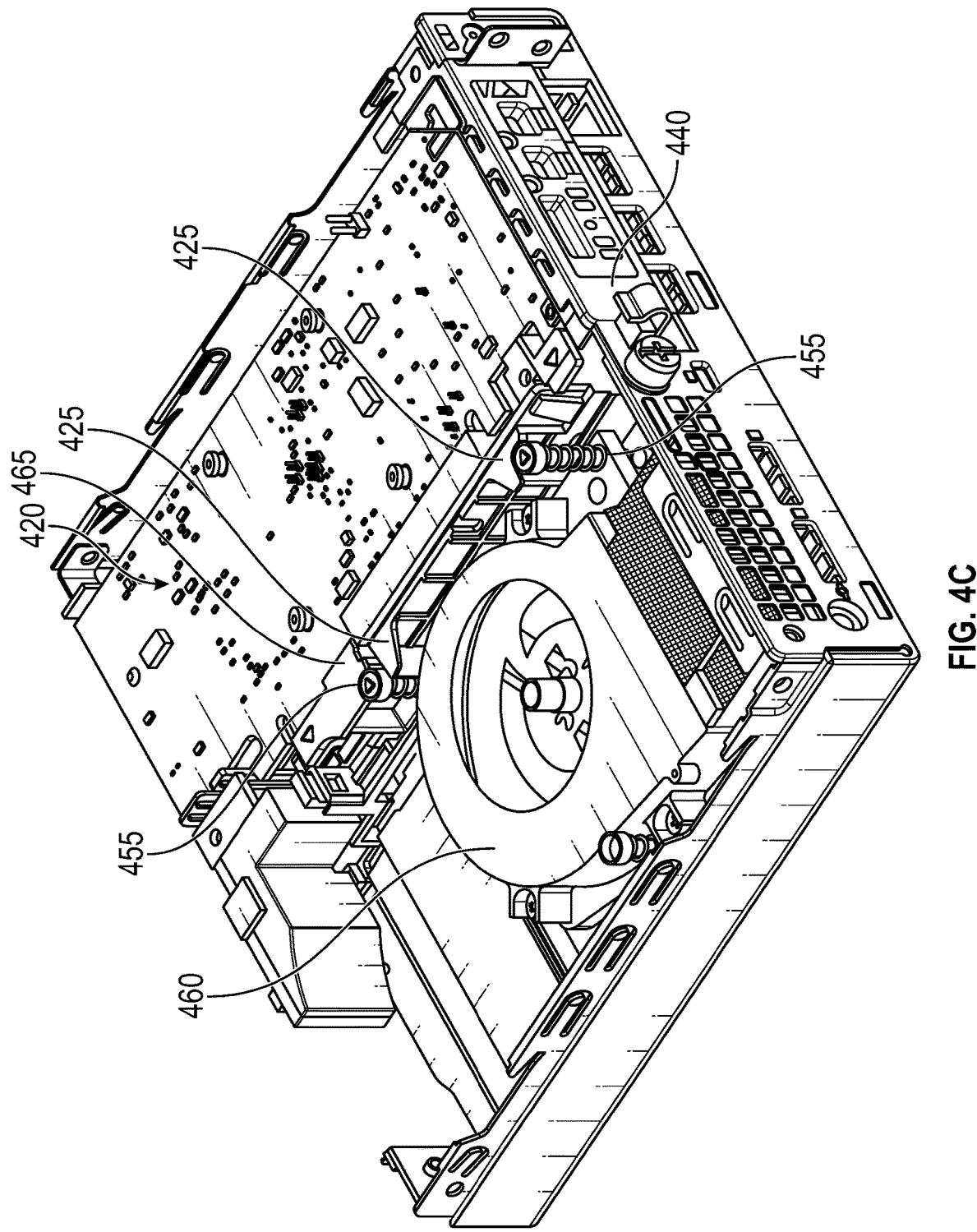
FIG. 4C is an illustration of expansion card installed to an IHS using a bracket according to various embodiments that supports installation of an expansion card using a riser card.

FIG. 4C is an illustration of expansion card 420 installed to an IHS using a bracket according to various embodiments that supports installation of an expansion card using a riser card. In FIG. 4C, the bracket has been fully seated within the expansion bay of the IHS such that the expansion card 420 has been coupled to the motherboard connector of the IHS via the riser card of the bracket. As illustrated, the protrusions 425 of the riser card portion of bracket are each aligned with respective stand-off screws 455 that are used to fasten the fan system 460 to the chassis of the IHS. Using such alignment features on the riser card portion of the bracket, a user may look down and align the protrusions 425 with the screws 455 and, as a result, also align the pins of the riser card with the motherboard connector without the user being able to actually see the coupling between the pins of the riser card and the motherboard connector. As described, other embodiments of the bracket may include a riser card portion with different protrusions that align with different reference structures within the IHS, such as with different fasteners by which a fan system or another component has been installed to the IHS.

In order to uninstall expansion card from the IHS, the user can pull upward on the handle portion 465 of the bracket in order to decouple the riser card from the expansion card connector. The handle of the riser card portion may then be used to lift the bracket from the expansion bay of the IHS. In this manner, the user is provided with the capability of installing and uninstalling an expansion card from an IHS using a riser card without use of tools. This capability provided by embodiments supports riser card installations of an expansion card within a densely packed IHS in which the motherboard connector to which the expansion card is being installed is not visible to the user as the riser card is coupled to the motherboard connector.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A bracket for coupling a expansion card to an Information Handling System (IHS), the bracket comprising:
   a riser card portion that receives a riser card that couples the expansion card to a motherboard connector of the IHS, wherein the riser card comprises a plurality of pins that are received by the motherboard connector and that are located along a first edge of a PCB (printed circuit board) of the riser card and further comprises a connector that receives the expansion card, and wherein the riser card portion comprises a first channel of a width that corresponds to a thickness of the PCB of the riser card that receives the first edge of the riser card along which are located the pins for connecting the riser card to the motherboard connector, and wherein the riser card portion of the bracket receives the riser card through an administrator pushing the first edge of the PCB along which the pins of the riser card are located into the first channel such that the first edge of the PCB of the riser card is received within the width of the first channel of the riser card portion of the bracket and the pins located along the first edge of the riser card extend from the bracket for connecting the riser card to the motherboard connector; and
   a card-receiving portion that receives the expansion card, wherein the expansion card comprises a plurality of pins that couple to the connector of the riser card when the expansion card is inserted in the card-receiving portion, and wherein the card-receiving portion comprises a second channel that receives the expansion card, and wherein the second channel restricts vertical movement of the installed expansion card and also restricts vertical movement of the riser card when the expansion card is coupled to the riser card.

2. The bracket of claim 1, wherein the expansion card comprises a graphics card.

3. The bracket of claim 1, wherein the riser card portion of the bracket comprises a first plurality of protrusions for positioning the bracket on a motherboard of the IHS.

4. The bracket of claim 3, wherein the positioning aligns the pins of the riser card with the motherboard connector.

5. The bracket of claim 3, wherein the positioning of the bracket comprises positioning the protrusions of the riser card portion of the bracket in alignment with a plurality of fastening elements of the motherboard.

6. The bracket of claim 5, wherein the fastening elements attach a fan system of the IHS to the motherboard.

7. The bracket of claim 3, wherein the riser card portion is removable from the card-receiving portion of the bracket and wherein a replacement riser card portion comprises a second plurality of protrusions for positioning the bracket on the motherboard.

8. The bracket of claim 1, wherein the riser card is coupled to a motherboard and to the expansion card without use of any tools and without any fasteners.

9. The bracket of claim 1, wherein the riser card portion comprises a handle for pulling the bracket from the IHS by pulling the pins of the riser card from the motherboard connector.

10. An Information Handling System (IHS) comprising:
    one or more processors coupled to a motherboard;
    the motherboard comprising a first expansion card connector; and
    a bracket for coupling a expansion card to the first expansion card connector of the motherboard, wherein the bracket comprises:
      a riser card portion that receives a riser card that couples the expansion card to the first expansion card connector of the motherboard, wherein the riser card comprises a plurality of pins that are received by the expansion card connector of the motherboard and that are located along a first edge of a PCB (printed circuit board) of the riser card and that further comprises a connector that receives the expansion card, and wherein the riser card portion comprises a first channel of a width that corresponds to a thickness of the PCB of the riser card that receives the first edge of the riser card along which are located the pins for connecting the riser card to the expansion card connector of the motherboard, and wherein the riser card portion of the bracket receives the riser card through an administrator pushing the first edge of the PCB along which the pins of the riser card are located into the first channel such that the first edge of the PCB of the riser card is received within the width of the first channel of the riser card portion of the bracket and the pins located along the first edge of the riser card extend from the bracket for connecting the riser card to the expansion card connector of the motherboard; and
      a card-receiving portion that receives the expansion card, wherein the expansion card comprises a plurality of pins that couple to the connector of the riser card when the expansion card is inserted in the card-receiving portion, and wherein the card-receiving portion comprises a second channel that receives a retainer of the expansion card, and wherein the second channel restricts vertical movement of the installed expansion card and also restricts vertical movement of the riser card when the expansion card is coupled to the riser card.

11. The IHS of claim 10, wherein the riser card portion of the bracket comprises a first plurality of protrusions for positioning the bracket on the motherboard of the IHS.

12. The IHS of claim 11, wherein the positioning aligns the pins of the riser card with the first expansion card connector of the motherboard.

13. The IHS of claim 11, wherein the positioning of the bracket comprises positioning the protrusions of the riser card portion of the bracket in alignment with a plurality of fastening elements of the motherboard.

14. The IHS of claim 13, wherein the fastening elements attach a fan system of the IHS to the motherboard.

15. A method for coupling a expansion card to an Information Handling System (IHS), the method comprising:
    seating a riser card in a riser card portion of a bracket, wherein the riser card comprises a plurality of pins that are received by a motherboard connector of the IHS and that are located along a first edge of a PCB (printed circuit board) of the riser card and further comprises a connector that receives the expansion card, and wherein the riser card is seated within a first channel of the riser card portion, where the first channel is of a width that corresponds to a thickness of the PCB of the riser card and where the first channel receives the first edge of the riser card along which are located the pins for connecting the riser card to the motherboard connector, and wherein the riser card is seated in the riser card portion through an administrator pushing the first edge of the PCB along which the pins of the riser card are located into the first channel such that the first edge of the PCB of the riser card is received within the width of the first channel of the riser card portion of the bracket and the pins located along the first edge of the riser card extend from the bracket for connecting the riser card to the motherboard connector;

seating the expansion card in a card-receiving portion of the bracket, wherein the expansion card comprises a plurality of pins that couple to the connector of the riser card when the expansion card is seated in the card-receiving portion, and wherein the card-receiving portion comprises a second channel that receives the seated expansion card, wherein the second channel restricts vertical movement of the seated expansion card and also restricts vertical movement of the seated riser card;

aligning one or more protrusions of the riser card portion of the bracket with respective fasteners of a motherboard of the IHS; and while the protrusions of the riser card portion are aligned with the fasteners, coupling the pins of the riser card to a motherboard connector of the IHS.

16. The method of claim 15, wherein the alignment using the one or more protrusions of the riser card portion of the bracket aligns the pins of the riser card with the motherboard connector.

17. The method of claim 15, wherein the fasteners comprise screws that fasten a first hardware component to the IHS.

18. The method of claim 17, wherein the first hardware component comprises a fan system of the IHS.

19. The method of claim 15, wherein the riser card is seated in the bracket, the expansion card is seated in the bracket, and the riser card is coupled to the motherboard connector without use of any tools.

20. The method of claim 15, further comprising:

pulling the bracket comprising the seated riser card and the seated expansion card from the IHS by pulling the pins of the riser card from the motherboard connector using a handle of the riser card portion of the bracket.

\* \* \* \* \*